Sept. 13, 1955   R. N. JANEWAY   2,717,559
RAILWAY TRUCK SPRING SUSPENSION
Original Filed Dec. 11, 1944   4 Sheets-Sheet 4
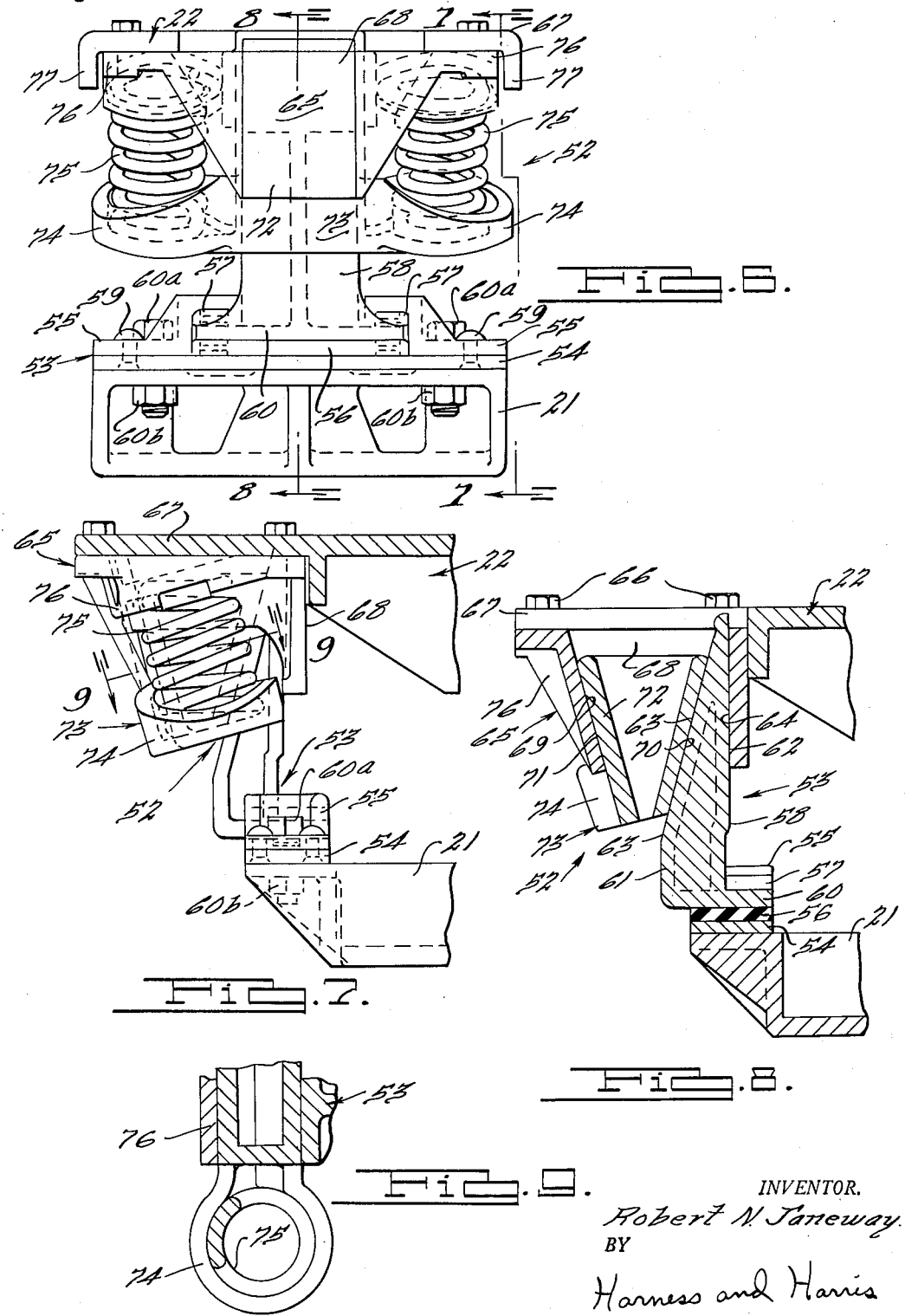
INVENTOR.
Robert N. Janeway
BY
Harness and Harris
ATTORNEYS.

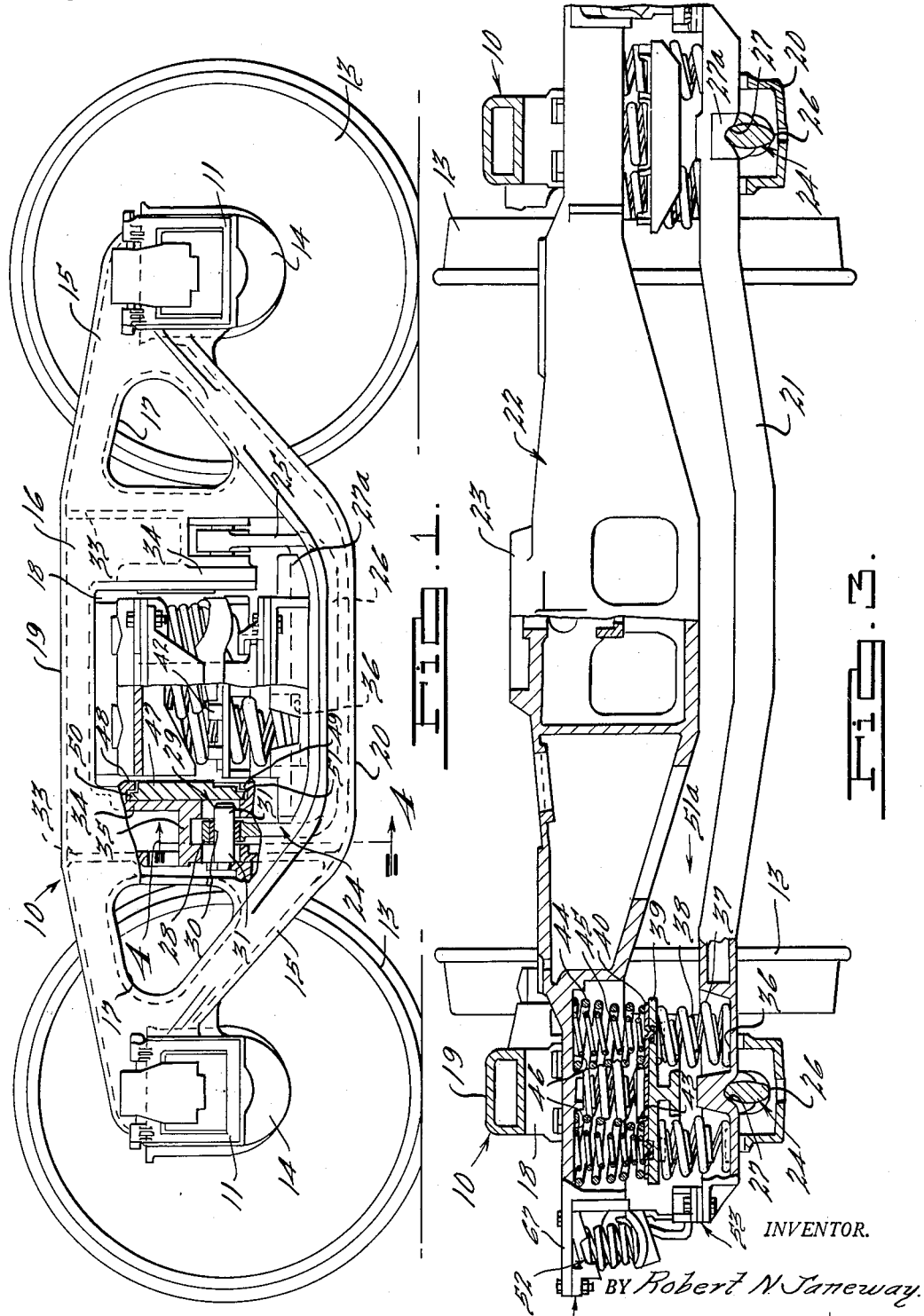

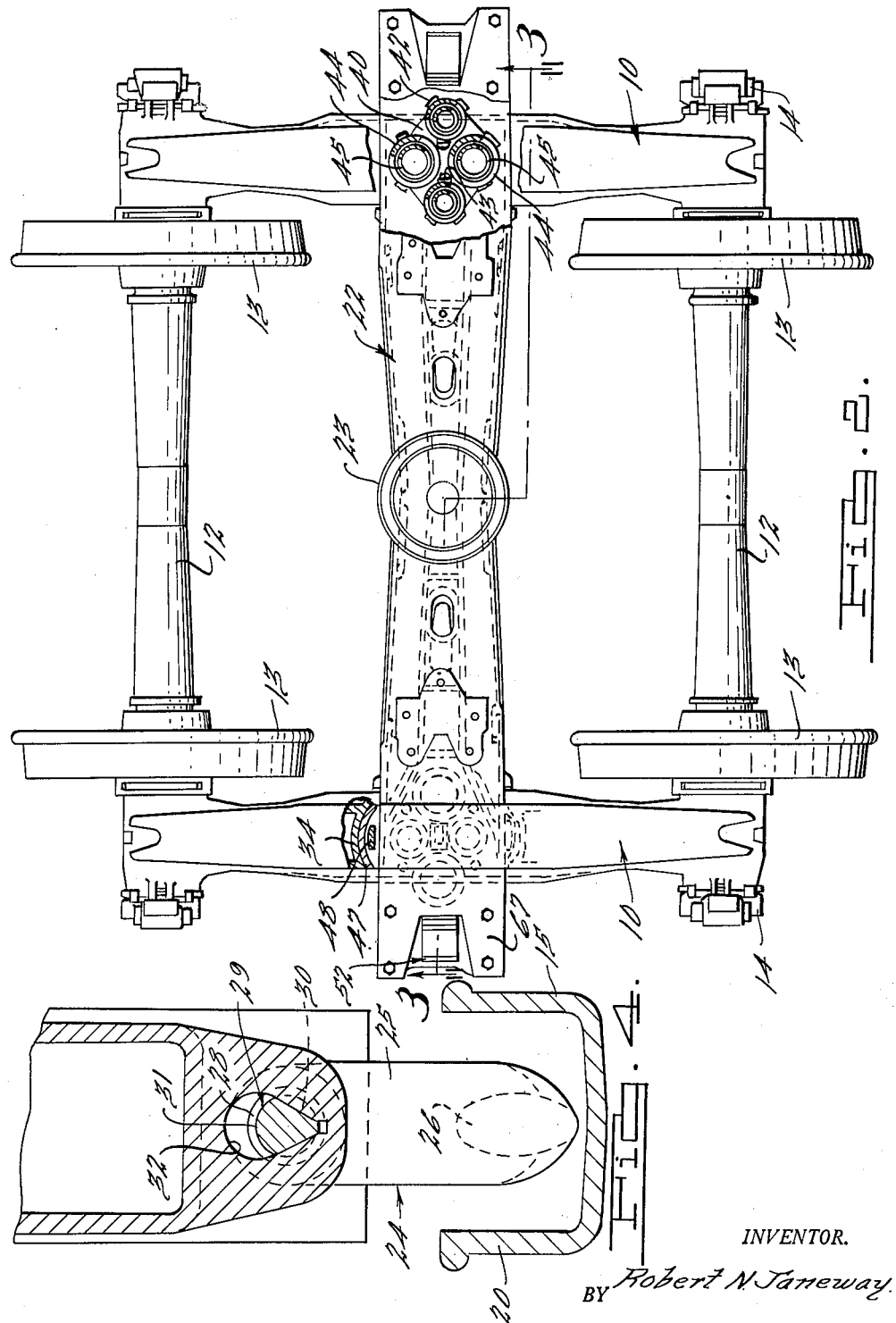

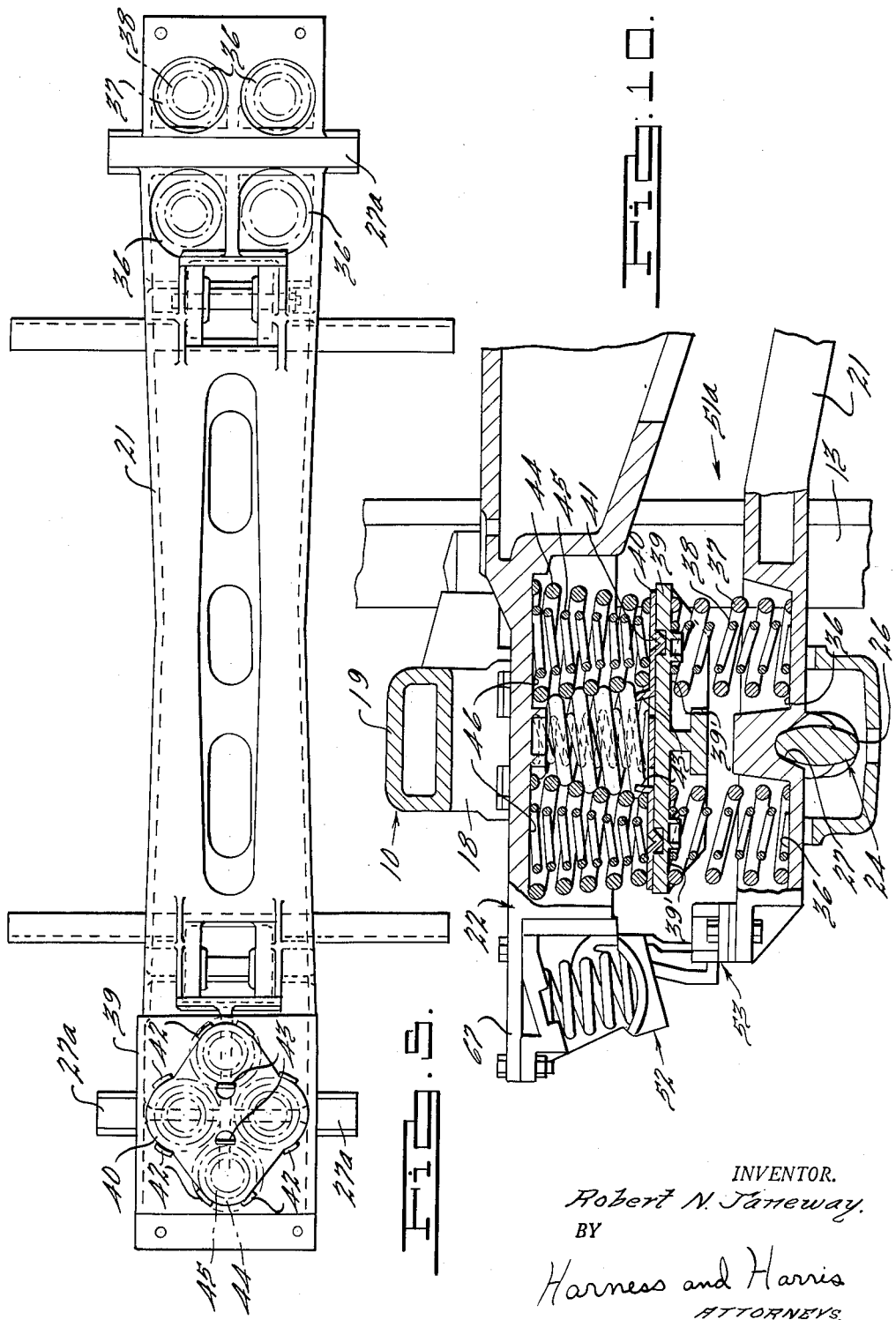

United States Patent Office 2,717,559
Patented Sept. 13, 1955

2,717,559

RAILWAY TRUCK SPRING SUSPENSION

Robert N. Janeway, Detroit, Mich., assignor to Chrysler Corporation, Highland Park, Mich., a corporation of Delaware Original application December 11, 1944, Serial No. 567,603. Divided and this application July 8, 1950, Serial No. 172,734

2 Claims. (Cl. 105—190)

This application relates to a railway car truck and more particularly to an improved suspension means for the sprung load supporting member of a railway freight car truck or the like. This improved suspension is particularly suited for high speed freight car trucks due to the fact that it is adapted to handle variable car loadings with equal proficiency. In addition vertical and horizontal shocks, applied to the truck as a result of irregularity of track, road bed, switches, crossovers, etc., are substantially dissipated by this suspension. This application is a division of my co-pending application Serial No. 567,603 filed December 11, 1944, now U. S. Patent 2,584,880.

The suspension of a freight car truck presents considerable difficulty, because it must serve the freight car both when the car is full and when it is empty. The range of load from full to empty may be considerable, and it is a problem to provide a resilient means in the suspension that is suitable to both extremes of loading. In general springs of ordinary construction have insufficient deflection at empty or light load for adequate cushioning, when the full load deflection is kept within prescribed limits of coupler height variation. I have solved this problem by a novel arrangement of springs that provides a satisfactory suspension at all loads and yet has a satisfactory deflection between no load and full load. I have also provided a variable rate snubber unit to cooperate with this variable deflection sprung suspension in a novel manner. I have also provided the freight car truck with means for swingably mounting the truck bolster on the side frames for controlled movement of the bolster in a direction transverse of the side frames. This latter mounting means is also relied upon to control unsquaring of the side frames. In addition, I have provided a novel damper or energy absorber that tends to prevent shimmy of the car truck involving periodic squaring and unsquaring of the side frames.

An object of the present invention is to provide an improved resilient supporting means capable of accommodating a wide range of loads with a total deflection held within permissible limits. Such a resilient means is advantageously applied to a railway car truck, or more specifically to a freight car truck.

An additional object of this invention is to associate a novel type of shock absorber or snubber unit with the sprung load supporting member of the suspension system.

A further object is to provide in a railway car truck such as a freight car truck an improved mounting providing for transverse swinging of the load supporting bolster or similar body-connected member with respect to the side frames.

Another object is the provision of an improved suspension that has incorporated therein means for resisting and controlling unsquaring of a railway car truck side members, said means having sufficient resilience to permit a limited amount of unsquaring.

Still another object is the provision in a railway car truck, of a novel damper or energy absorber for preventing shimmy of the truck that may be excited by resonant unsquaring impulses imposed upon the truck.

Other objects will appear from the disclosure.

In the drawings:

Fig. 1 is a side view, partially in section, of one form of the novel railway truck of the present invention;

Fig. 2 is a plan view of the truck of Fig. 1;

Fig. 3 is a sectional view taken on the line 3—3 of Fig. 2;

Fig. 4 is a sectional view taken on the line 4—4 of Fig. 1;

Fig. 5 is a plan view of a plank of the truck of the present invention with an intermediate spring-spacing member over one end thereof;

Fig. 6 is an end view of the plank and the bolster of the railroad truck, showing a snubber acting between the plank and the bolster;

Fig. 7 is a sectional view taken on the line 7—7 of Fig. 6;

Fig. 8 is a sectional view taken on the line 8—8 of Fig. 6;

Fig. 9 is a sectional view taken on the line 9—9 of Fig. 7; and

Fig. 10 is an enlarged sectional elevation of the left end of the plank and bolster structure shown in Fig. 3.

One form of the novel railway truck of the present invention includes equalizer members or side frames 10 having bearings 11 journalling the ends of a pair of axles 12 supported on wheels 13. Each side frame 10 has at its ends housing portions 14 containing the bearings 11. Adjacent the housing portions 14 are portions 15 having top and bottom members diverging in a direction away from the housing portions 14 so that each portion 15 of the side frame is generally triangular in shape. Between the triangular portions 15 is an intermediate portion 16 of rectangular shape. The side frame 10 is of a truss-type construction, the triangular portions 15 having triangular openings 17, and the intermediate rectangular portion 16, a rectangular opening 18. The upper side of the side frame 10 is of rectangular box-like construction as indicated by the reference character 19 in Fig. 3, the same being true of the lower sides of the triangular portions 16. The lower side of the intermediate portion 16 is of channel shape as indicated at 20 in Fig. 3. The upper or top side of the side frame may be termed the compression member and the lower or bottom side the tension member.

Extending transversely of the truck through the rectangular openings 18 in the side frames 10 is a plank 21. A bolster 22 is mounted on the plank 21 by resilient means to be described presently. The bolster 22 also extends transversely through the openings 18 in the side frames 10 and has a center bearing 23 at an intermediate region. The plank 21 is supported upon U-shaped swing hangers 24, which have legs 25 and a base 26. The bases 26 of the hangers 24 fit in grooves 27 formed in the under side of the plank 21. Extensions 27a at the sides of the plank 21 as indicated in Fig. 5 also have the groove 27 so that the groove is of considerable length. The engagement of the bases 26 with the grooves 27 is such as to provide relative angular or pivotal movement between the swing hangers 24 and the plank 21 about the swing hanger bases 26 as axes. This prevents shifting or angular displacement of the bases of the hangers relative to the plank and transverse of the side frames 10. The free ends of the legs 25 of the swing hangers 24 have openings therethrough provided with bearing sleeves 28, through which extend mounting members 29, having intermediate circular or substantially cylindrical bearing regions 30 mounted in the bearing sleeves 28 and terminal non-circular or non-cylindrical regions 31 fitting in correspondingly shaped openings 32 in the side frames 10. Fig. 4 shows the shape of the regions 31 and the openings 32. For each mounting member 29 one opening 32 is formed in a vertical transverse wall 33, extending from the top of the side frame 10 to the bottom thereof and marking one end of the central rectangular portion 16 of the side frame. The other opening 32 for each mounting member 29 is formed in a flange of vertical transverse portion 34, which as seen in Fig. 2 is arcuate in transverse section. A wall portion 35 bridges the space between the wall portion 34 and the wall 33. The wall portions 33, 34 and 35 constitute a column extending between the top compression member 19 and the bottom tension member 20 of the side frame 10. The non-circular ends 31 on the mounting members 29 and the non-circular openings 32 receiving the mounting member ends prevent rotative movement of the mounting members. The swing hangers 24 can swing about the central bearing portions 30 as axes. When this happens, there is angular or pivotal movement of the swing hangers 24 about their bases 26 as axes with respect to the plank 21. Thus the plank 21 may move transversely with respect to the side frames 10. The legs of the swing hangers 24 depend below the portion 35 and so lie within the horizontal limits of the columns of which the portions 35 form parts. The extensions 27a on the spring plank engage portions of the swing hanger bases below the portions 35 and thus below the columns. This arrangement by which the swing hanger legs depend within the side frame columns and the plank engages the swing hanger base beneath or within the columns, permits the engagement of plank and swing hanger base to be as long as possible for a given width of bolster. It will be noted that the swing hanger base lies in the U-shaped cavity of the lower tension member 20 of the side frame. Thus the pivot axes of the hangers 24 are enabled to be relatively low, being slightly lower than the axes of the wheels 13, with the advantage of stability in the truck. By locating the swing-hanger bases between the flanges of the tension members of the side frames and below the level of the tops of said flanges, the springs for supporting the bolster can be sufficiently long to provide a yielding support giving to the bolster the desired movement to cushion vertical shocks imposed thereon. Moreover, in event of failure of the swing hanger, the plank need descend only a short distance to the tension member thereunder, and the swing hanger may be safely trapped in the tension member cavity.

The mounting of the swing hanger pivot pins 29 at or below the level of support of the side members 10 on the axles 12 ensures the stability of this truck for it permits the side frames 10 to function as pendulums and to return to dead center when the forces causing their lateral or transverse deflection have been dissipated. This prevents tipping or cocking of the side frames on the axles and maintains a stable condition of equilibrium. Obviously if the pivot pins 29 are above the level of support of the side frames on the axles then a stable condition of equilibrium of the side frames does not exist for there will be no restoring force to return the side frames to dead center after dissipation of the lateral forces causing transverse swinging of the swing hangers and side frames.

However, angular movement of the plank 21 about vertical axes through the side frames 10 with respect to the side frames is resisted, because similar movement of the swing hangers 24 with respect to the plank 21 is prevented through engagement of the bases 26 of the swing hangers with the grooves 27 in the plank 21, and similar movement of the swing hangers with respect to the side frames is prevented by the mounting members 29. It has been said that angular movement of the plank 21 about vertical axes through the side frames is resiliently resisted, for the legs 25 of the hangers 24 may shift angularly with respect to one another about the base portion 26 as an axis by causing twisting of the base portion itself within its elastic limit. A small angular movement of the plank 21 results, and this permits a limited amount of movement of one side frame 10 in the direction of its length with respect to the other side frame. This is known as "unsquaring." It occurs when the car truck is traveling on a curve, or when one side of the truck is subjected to a longitudinal impact. When the truck returns to straight track, the side frames 10 must return to their original relative position, and this takes place, because the twisting of the base 26 of the hangers 24 occurs entirely within the elastic limit.

As previously stated, the bolster 22 is resiliently mounted on the plank 21. The means for accomplishing this will now be described. Each end of the plank 21 has formed therein four shallow recesses or seats 36. Mounted in the seats 36 are four sets of springs, each set being composed of an outer cylindrical spring 37 and an inner cylindrical spring 38. An intermediate member 39 rests on the upper ends of the springs 37 and 38 and has four seats 39' on its lower side receiving the said spring upper ends. A sheet metal plate 40 rests on the upper side of the intermediate member 39 and has pressed-out portions 41 fitting in recesses in the member 39 for locating the plate 40 with respect to the member 39 and flanges 42 and struck-out portions 43 forming spring seats. These seats receive four sets of springs, each set comprising an outer conical spring 44 and an inner conical spring 45. As seen in Figs. 2 and 3, two sets of conical springs have their large ends up, and two sets of conical springs have their large ends down. This arrangement enables the four sets of conical springs to occupy a minimum of space. The upper ends of the conical springs are received in seats 46 formed on the under side of the end of the bolster 22. The conical springs are of the type having the outer diameter of one turn greater than the inner diameter of the next larger turn so as to retain a conical form when collapsed with one turn abutting an adjacent turn. From the foregoing description it will be apparent that the ends of the bolster 22 are mounted on the ends of the swing plank 21 by means of conical springs and cylindrical springs, the conical springs being in series with the cylindrical springs. The conical springs have a varying rate of deflection or stiffness that increases with the amount of closing of the springs and approaches infinity as the closing of the springs approaches completeness. The reason for the change in the stiffness or rate of the deflection is that the deflection and closing of the spring moves progressively from the large end toward the small end, because the stiffness or resitance to deflection is smaller the greater the coil diameter for a given thickness of the pring bar, thus the active coils progressively become fewer and of smaller diameter as the load thereon increases. The cylindrical springs have a substantially constant rate of deflection throughout their deflection. The conical springs and cylindrical springs are so proportioned that deflection with light loading begins with all coils of the conical springs operating, and, as the load increases the coils of the conical springs close, beginning at the large ends and progressing toward the small ends thereof until a condition of complete closing of the conical springs is reached, at which point of deflection the cylindrical springs only remain effective. This series arrangement of conical and cylindrical springs is ideally suited to freight cars, in which the loading may vary considerably from empty to full. If relatively stiff cylindrical springs were used they would provide a good mounting for heavy loads, but a poor one for light loads. If relatively soft springs were used so that a good mounting might be had for light loads, then in order to accommodate a heavy load the deflection would be so great as to exceed permissible variations in height of the car body and couplers. Thus a conical spring would apparently provide sufficient resilience at light loads without too great a deflection to accommodate heavy loads, since the increasing deflection rate with increasing deflection limits total deflection. However, as the deflection of a conical spring approaches completeness, the rate of deflection approaches infinity, and so a conical spring tends to become too stiff and to have inadequate travel beyond full load. A cylindrical spring arranged in series with the conical spring and proportioned so as to permit continued deflection at a constant rate beyond the upper limit of deflection of the conical spring is thus used.

As previously stated, the transverse vertical column portions 34 are arcuate in transverse section. Engaging the concave side of each portion 34 is a shoe 47, curved on one side and flat on the other side. The curved side engages the portion 34, and the flat side, the bolster 22. The shoe 47 is retained in place at the portion 34 by flanged projections 48 and 49 that engage shoulders 50 and 51 formed at the flat side of the shoe 47. It will be seen that the bolster slides on the flat sides of the shoes 47 as the plank moves transversely through swinging of the hangers 24. When the plank 21 and the bolster 22 pivot with respect to the side frames 10 upon limited unsquaring of the side frames permitted by the elastic twisting of the bases 26 of the hangers 24, the arcuate sides of the shoes 47 slide upon the adjacent, contiguous portions 34 of the side frames. This also takes place as the side frames adjust themselves from unsquared condition to squared condition. Since the shifting of the side frames 10 between squared and unsquared condition takes place as a result of the elasticity of the U-shaped hangers 24, there may be shimmy set up in the parts, and this is prevented by the sliding contact of the arcuate sides of the shoes 47 with the portions 34 of the side frames 10. The shoes 47 and portions 34 act in effect like shock absorbers or dampers and also provide adequate areas of contact between the bolster and the side frames.

Figs. 6–9, inclusive, show snubbers or energy absorbers 52 of a special type for the springs 37, 38, 44, and 45. There is one at each side of the truck, outward of a side frame 10, that is attached to an end of the plank 21 and the overlying bolster 22. A lower assembly 53 comprises a plate 54, a pair of clamps 55, a large lower rubber part 56, two small upper rubber parts 57, and an upright member 58. The plate 54 rests upon the upper side of the very end of the plank 21, and to the plate 54 are secured the clamps 55 by rivets 59. The member 58 has a base 60, which is held between the plate 54 and the clamps 55 by the large lower rubber part 56 and the two small upper rubber parts 57. The lower assembly 53 is secured to the end of the plank 21 by bolts 60a and nuts 60b. The member 58 has an upstanding portion 61, which is of H-section diminishing in size upwardly so that it has a vertical friction surface 62 and an inclined friction surface 63. The vertical friction surface 62 has sliding contact with a vertical surface 64 formed on an upper member 65 secured by bolts 66 to a U-shaped portion 67 formed integral with the end of the bolster 22. The upper member 65 has a central portion 68, on which the vertical surface 64 is formed. The central portion also has an inclined friction surface 69. The surfaces 63 and 69 are inclined in reversed directions to the vertical and are engaged by mating friction surfaces 70 and 71, respectively, formed upon opposite sides of a central portion 72 of a movable member 73. This member 73 has lower end portions 74, which are shaped as pockets to receive the lower ends of cylindrical springs 75, the upper ends of which are received in pockets formed in end portions 76 of the upper member 65. The sides of the U-shaped portion 67 of the end of the bolster 22 have depending flanges 77, which embrace the end portions 76 of the upper member 65, as shown in Fig. 6. The springs 75 are inclined to the vertical at the same angle as the friction surfaces 69 and 71 on the upper member 65 and the movable member 73. When in operation, if bolster 22 moves downwardly with respect to the plank 21, this movement is resisted by the springs 37, 38, 44, and 45, which have a deflection rate increasing with total deflection or load.

The effectiveness of damping depends upon a ratio of friction force to deflection rate of the spring suspension. In the case of a constant rate suspension a damping device having a constant friction force independent of deflection is satisfactory. However, where the deflection rate of the suspension changes with the deflection as in the suspension of the present application, which is composed of conical springs and cylindrical springs in series, it becomes necessary for the friction of the damper or snubber to vary with the deflection and to be preferably substantially in proportion to the deflection rate of the suspension. In general, the friction should vary in direct proportion to the deflection rate of suspension.

The snubbers or energy absorbers 52 have a friction force or, in other words, a resistance to displacement that increases with overall deflection of the series arranged, bolster supporting, spring assemblies. This is due to the arrangement of the spring pressed, wedging, friction surfaces 63, 70, 69 and 71 and the associated springs 75. The vertical friction surface 62 and the inclined friction surface 63 of unit 53 provide the plank supported member 58 with a wedge member that cooperates with the spring pressed bolster supported wedge member 65 to provide a frictional energy absorbing unit having a friction force that progressively increases with deflection of the bolster 22 relative to the plank 21. Practical considerations dictate that the springs 75 and the friction surfaces 69 and 71, along which sliding of the movable member 73 takes place with respect to the upper member 65, be at an angle to the vertical.

I claim:

1. In a railway truck comprising spaced side members, a plank member extending between and mounted on said side members, a bolster member resiliently supported in superimposed relation to said plank member, the resilient supporting means comprising a cylindrical coil spring and a conical coil spring arranged in series between said plank and bolster members so as to cooperate in transmitting the load of the bolster member to the plank member, the conical spring being of the type having the outer diameter of one turn greater than the inner diameter of the next larger turn so that the conical spring will retain a conical form when collapsed with one turn abutting an adjacent turn whereby the conical spring resistance to deflection progressively increases with increased load, said springs providing a bolster resilient supporting means having an overall stiffness that increases with load, said conical spring being of such a stiffness as to cushionly support relatively light bolster applied loads and said cylindrical spring being of such a stiffness to a cushionly support relatively heavy bolster applied loads, and a snubber unit connected between said bolster and plank members and arranged in parallel with the springs, said snubber unit providing a means that resists relative displacement of said plank and bolster members with a force that varies in proportion to the overall stiffness of the resilient supporting means.

2. A railway truck comprising spaced side members, a plank member extending between and mounted on said side members, a bolster member resiliently supported in superimposed relation on said plank member, the resilient supporting means for said bolster on said plank comprising a first resilient supporting means having a deflection rate constant with load, a second resilient supporting means comprising a conical coil spring of the type having the outer diameter of one turn greater than the inner diameter of the next adjacent larger turn so as to cause the spring under sufficient loading to close the coils thereof completely upon one another whereby the conical spring resistance to deflection progressively increases with increased load, the first and second resilient supporting means being arranged in series between the plank and bolster members so as to cooperatively transmit the load of the bolster member to the plank member and being so proportioned that the loading required for complete closing of the conical spring is less than that required for maximum deflection of the first resilient means, said resilient supporting means providing a bolster resilient suspension having an overall stiffness that varies in direct proportion to the load applied thereto, and an energy absorber connected between said bolster and plank members and arranged in parallel with the resilient supporting means, said absorber providing a means that resists relative displacement of said plank and bolster members with a force that varies in direct proportion to the progressively increasing overall stiffness of the resilient supporting means with compression thereof.

References Cited in the file of this patent

UNITED STATES PATENTS

| Number | Name | Date |
|---|---|---|
| Re. 7,536 | Horner | Feb. 27, 1877 |
| 42,519 | Vidal | Apr. 26, 1864 |
| 330,446 | Vose | Nov. 17, 1885 |
| 485,652 | Pfingst | Nov. 8, 1892 |
| 516,360 | Turton | Mar. 13, 1894 |
| 655,738 | Robinson | Aug. 14, 1900 |
| 1,990,379 | Holland | Feb. 5, 1935 |
| 2,267,153 | Holland | Dec. 23, 1941 |
| 2,321,845 | Nystrom et al. | June 15, 1943 |
| 2,326,993 | Buckwalter | Aug. 17, 1943 |
| 2,434,287 | Pflager | Jan. 13, 1948 |
| 2,444,337 | Cottrell | June 29, 1948 |
| 2,483,858 | Van der Sluys | Oct. 4, 1949 |

FOREIGN PATENTS

| Number | Country | Date |
|---|---|---|
| 552,698 | Germany | June 17, 1932 |